July 2, 1957   H. E. MICHENER, JR., ET AL   2,797,940
MECHANICAL SHAFT SEAL
Filed March 28, 1955

INVENTORS
HERBERT E. MICHENER, JR.
JAMES R. SMITH
BY
Robert Henderson
ATTORNEY

United States Patent Office 2,797,940
Patented July 2, 1957

2,797,940

MECHANICAL SHAFT SEAL

Herbert E. Michener, Jr., and James R. Smith, Palmyra, N. Y., assignors to The Garlock Packing Company, Palmyra, N. Y., a corporation of New York Application March 28, 1955, Serial No. 497,086

4 Claims. (Cl. 286—11.15)

This invention relates to improvements in mechanical shaft sealing devices such as are employed for preventing passage of contained or pressurized fluid between a rotary shaft and a shaft opening in a machine casing.

An important object of the invention is the provision of such a seal which may readily be tightened upon a shaft in substantially perfect concentricity to the latter.

Another important object is the simplification of such a seal to render the seal less likely than prior seals to fail in service and, also, to enable the seal to be more economically produced.

Another important object is the provision of such a seal wherein an essential spring therein is fully protected against the deleterious action of acids or sludge in the sealed fluid.

Another important object is the provision of such a seal including parts functioning as a guage assuring that the device may be installed with a precise, desired compression of said spring; wherein said guage parts are simple and inexpensive to produce and assemble, and wherein one of said guage parts functions also as a part of the means for tightening the device upon a shaft.

A single preferred embodiment of this invention is presented in the accompanying drawing, for purpose of illustration, without, however, limiting the invention to that particular embodment.

Figure 2:
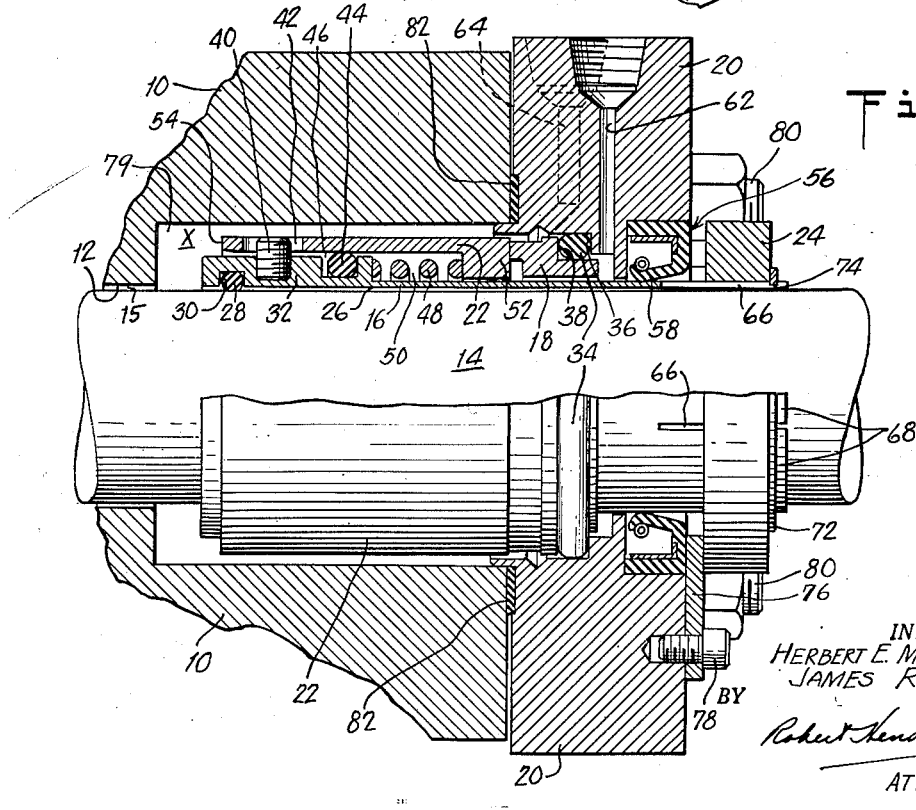
Fig. 2 is a sectional view thereof, substantially on the irregular line 2—2 of Fig. 1; some parts of the device being shown in elevation in the lower half of the figure.

A casing 10 of a pump or other machine is formed with an opening 12 through which extends a rotary shaft 14 which, for example, may be provided with a pump impeller (not shown) or other part to turn with or to be turned by the shaft. As a practical matter, there is an annular space or clearance 15 between the shaft and the wall defining the opening 12; and all parts shown in Fig. 2, and not hereinbefore detailed, constitute an improved mechanical seal, according to this invention, to prevent passage of fluid along the shaft in said space 15.

The mechanical seal, in its fundamentals, comprises a mostly rigid, mounting sleeve 16 adapted for fluid-tight fixation upon shaft 14 for rotation therewith, a rigid, annular, stationary, sealing seat 18, non-rotatably and fluid-tightly supported within a rigid collar 20, a spring-pressed, rigid sealing sleeve 22, axially-shiftably sealed to sleeve 16 and effecting a rotary sliding seal with seat 18, and a slightly resilient clamping ring 24 encircling a fingered end portion of the sleeve 16 to clamp the latter firmly upon the shaft.

Practically, as the seal is normally produced separately or, i. e., apart from the shaft 14, there would be a slight annular clearance 26 or at least an easy sliding or loose fit between the shaft and the sleeve 16; and to give fluid-tightness between the two latter parts, an O ring 28 of rubber is disposed within an internal, annular packing groove 30 in an enlarged rear end portion 32 of the sleeve 16. In use, the ring 28 is compressed radially between the bottom surface of the groove 30 and the surface of shaft 14 to form a static seal or packing therebetween. All references herein to "rubber" are intended to include rubber-like material adapted to function as rubber or in the manner described in this specification.

The sealing seat 18 is preferably supported vibrationally by a rubber O vibration ring 34, or an equivalent ring, retained under compression, both axially and radially, within a rectangular, annular space defined by annular grooves 36 and 38, formed respectively in the collar 20 and the outer end of the seat 18.

The sealing sleeve 22 is constrained to turn with sleeve 16 by a stud 40, tightly fixed into enlarged portion 32 of the mounting sleeve and extending radially outwardly, from the latter, slidably into a longitudinal slot 42 in the back end of sealing sleeve 22. This stud and slot arrangement, which may be duplicated or triplicated at two or three points about the circumferences of the two sleeves, not only constrains the two said sleeves to rotate together but also permits limited axial shifting of sealing sleeve 22 relatively to the mounting sleeve 16.

A rubber O sealing ring 44 in an external annular groove 46 in enlarged portion 32 of the mounting sleeve affords fluid-tightness between sleeves 16 and 22 while permitting the mentioned axial shifting of sealng sleeve 22. A compression coil spring 48, within a substantially enclosed annular space 50 between the sleeves 16 and 22, bears at one end against the front end surface of enlarged portion 32 of the mounting sleeve and at its other end against a back end surface of an enlarged front end portion or sealing nose 52, thereby urging sleeve 22 continuously toward seat 18 to establish a rotary, sliding sealing cooperation between adjacent, flat end surfaces of said nose and seat.

It will be understood that, with sleeve 16 fixed upon shaft 14 as hereinafter explained, the force of spring 48 and the force exerted by the pressure of sealed fluid, in the area $x$, against the back end surface 54 of sealing sleeve 22, operate to maintain such rotary, sliding sealing engagement of said nose and seat, even in the presence of end play or other irregularity of shaft operation.

A suitable, annular fluid seal 56 is fitted tightly into an internal annular recess at the front side of the collar 20 so that its sealing lip 58 slidingly engages sleeves 16 to prevent any fluid that might leak from finding its way to the front end of the collar. The collar is preferably provided with a drain duct 60 to carry off any possible leaked fluid, through suitably connected piping (not shown), to waste or to a recovery receptacle. Also, a vent duct 62 may be provided in the collar 20 connecting the area between seat 18 and seal 56, through suitably connected piping (not shown), with atmosphere.

A third duct 64 may be provided, if desired, in the collar 20 which, with piping (not shown), suitably connected separately to the body of sealed fluid, may enable sealed fluid to be circulated about the exteriors of seat 18 and sleeve 22 to cool the latter.

The forward end of mounting sleeve 16 is formed with several open longitudinal slots 66 (four as illustrated) defining plural, resilient fingers 68. Surrounding these fingers is the split clamping ring 24 having a tangentially disposed tightening screw 70. The clamping ring is held against unintended dislodgment from the front end of the sleeve 16 by a split snap-ring 72, normally seated under contractile tension within similar external, arcuate grooves 74 in the fingers 68, which grooves, in effect, constitute an annular groove.

It should be understood that the expansive force of spring 48 should be great enough to maintain a substantially fluid-tight, rotary sliding engagement between sealing seat 18 and sealing sleeve 22, but, to minimize friction and resultant wear of parts 18 and 22, said force should not be greater or at least should not be much greater than necessary to maintain the fluid-tightness of such sliding engagement. The present device lends itself to installation with the spring 48 compressed to the extent that the seal manufacturer has ascertained to be most desirable. Thus, it may have been ascertained by the manufacturer that, if a certain spacing is provided between the outer face of collar 20 and the inner face of ring 24, when the seal goes into service, the compression of the spring will be such as to enable the seal to give satisfactory sealing service for a substantial period of operation.

Figure 1:
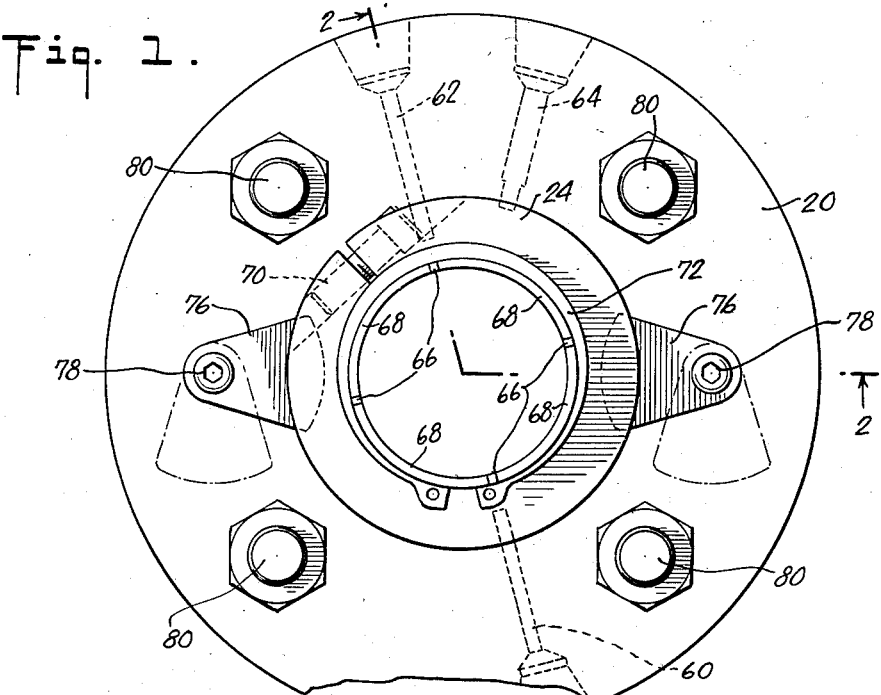
Figure 1 is an end elevational view of said preferred embodiment.

To provide accurately such desired degree of compression of the spring 48, the device preferably includes two spacer lugs 76 which are pivotally secured to the front end or face of the collar 20 by screws 78. These lugs may be disposed in spacing position as shown in full lines in Fig. 1 or in inactive position as shown in broken lines in said figure, and may be locked in either position by tightening the screws 78. They are intended to be in spacing position prior to installation of the seal or at any time when the seal is not in service, in which position they extend between the front face of collar 20 and the back face of clamping ring 24 to space the two last-mentioned parts from each other.

The condition that the spacer lugs 76 are in spacing position prior to installation results in the spring 48 being held under compression and seat 18 and sleeve 22 being held firmly in face-to-face contact during shipment and other handling of the seal prior to installation, thereby avoiding possible damage to the last-mentioned parts which would undoubtedly occur if they were not thus firmly held against relative movement prior to installation of the seal.

The seal is installed by first making certain that tightening screw 70 has been loosened and then sliding the seal onto and along the shaft 14 and into recess 79 in the casing and by securing the collar 20 to the casing 10 by means of bolts 80; a gasket 82 preferably being employed between the collar and the casing. Then, while the lugs 76 are in their spacing positions to hold spring 48 to its desired degree of compression, tightening screw 70 is tightened to contract the clamping ring 24 and thereby cause fingers 68 to firmly grip the shaft. Thereafter, as the collar 20 and sleeve 16, respectively, are fixed to the casing 10 and the shaft 14 and thus are able to maintain spring 48 properly compressed independently of the spacer lugs 76, screws 78 are loosened and the spacer lugs swung to inactive positions to permit the spring 48 to become effective and screws 78 are tightened to hold the lugs in the latter positions. In this condition of the seal, the precise preferred clearance is provided between the collar 20 and the clamping ring 24 to permit the rotary parts of the seal to shift axially of the collar 20 in the presence of shaft end play or other irregular shaft operation; and the spring 48 is compressed to the preferred extent. Such shifting, of course, could not occur if the spacer lugs were left in their spacing positions.

Ordinarily, the seat 18 would be of softer material than the sealing sleeve 22, which normally is of metal. The choice of materials for these two parts usually is influenced by the fluid to which they are to be subjected, the materials being of a character to resist deterioration from such fluid.

It may be noted that the fingers 68 and clamping ring 24 make it possible to mount the seal in perfect concentricity on the shaft, something which is difficult to accomplish when a set-screw is employed for said purpose; also, that spring 48 is never in contact with sealed fluid from the area x and, therefore, is protected against the deleterious effects of acid which may be in the sealed fluid. This protection also prevents sludge in the sealed fluid from collecting about the spring and damping its action.

It should be apparent that the present concepts may be employed in various additional ways without, however, departing from this invention as set forth in the following claims.

We claim:

1. A mechanical shaft seal for effecting a seal between a machine casing and a rotary shaft extending into a shaft opening in said casing, said seal comprising a metal mounting sleeve adapted to receive a shaft therein and having a rear end portion, a front end portion having plural radially resilient fingers and a portion intermediate said two end portions, means for sealing said mounting sleeve relatively to a shaft therein, a mounting collar freely surrounding said intermediate portion and adapted for fixation to said machine casing, an annular sealing seat fluid-tightly retained within said collar and in interfering relationship to the latter to limit axial movement of said sealing seat toward the front end of said collar, a sealing sleeve axially-slidably sealed with respect to said mounting sleeve and having an annular portion in rotary sliding sealing engagement with said sealing seat, means coacting with the two said sleeves for urging said sealing sleeve forwardly to maintain the latter in such sealing engagement with said seat and tending to urge said mounting sleeve rearwardly relatively to said mounting collar, a contractile clamping ring surrounding said fingers, forwardly of said collar, and adapted to contract said fingers firmly upon a shaft within said mounting collar, and an abutment ring fixedly associated with said fingers forwardly of said clamping ring in abutting relationship to the front end of the latter to limit such rearward movement of the mounting sleeve relatively to the mounting collar.

2. A mechanical shaft seal according to claim 1, further including a spacer finger, permanently carried upon the seal and movable, without separating it from the seal, into spacing position between said collar and clamping ring and also to an inactive position, and means for tightening said spacer finger in either of said positions.

3. A mechanical shaft seal according to claim 1, said rear end portion of the mounting sleeve being a radially outwardly enlarged annular portion, said sealing sleeve having an outer end portion closely surrounding said enlarged annular portion and a radially inwardly enlarged annular portion closely surrounding said intermediate portion of the mounting sleeve, the two said sleeves defining a substantially closed annular space therebetween and between said two enlarged portions, and said urging means comprising a spring protectively enclosed in said annular space and coacting with said two enlarged portions to impose the stated urging upon the mounting sleeve.

4. A mechanical shaft seal according to claim 3, further including packing means between said enlarged portion of the mounting sleeve and said outer end portion of the sealing sleeve to prevent fluid from passing between the two last-mentioned portions into said annular space.

References Cited in the file of this patent

UNITED STATES PATENTS

| 208,965 | Crowell | Oct. 15, 1878 |
| 836,408 | Somes | Nov. 20, 1906 |
| 2,429,953 | Bottomley | Oct. 28, 1947 |
| 2,479,711 | Arutunoff | Aug. 23, 1949 |
| 2,595,926 | Chambers | May 6, 1952 |

FOREIGN PATENTS

| 695,087 | Great Britain | Aug. 5, 1953 |